(12) United States Patent
Saito

(10) Patent No.: US 11,036,059 B2
(45) Date of Patent: Jun. 15, 2021

(54) IMAGING LENS AND IMAGING APPARATUS

(71) Applicant: FUJIFILM Corporation, Tokyo (JP)

(72) Inventor: Hiroki Saito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 212 days.

(21) Appl. No.: 16/286,131

(22) Filed: Feb. 26, 2019

(65) Prior Publication Data

US 2019/0265503 A1    Aug. 29, 2019

(30) Foreign Application Priority Data

Feb. 28, 2018    (JP) .............................. JP2018-035613

(51) Int. Cl.
| | |
|---|---|
| *G02B 27/64* | (2006.01) |
| *G02B 9/64* | (2006.01) |
| *G02B 13/02* | (2006.01) |
| *G02B 15/14* | (2006.01) |

(Continued)

(52) U.S. Cl.
CPC .............. *G02B 27/646* (2013.01); *G02B 9/12* (2013.01); *G02B 9/34* (2013.01); *G02B 9/60* (2013.01);
(Continued)

(58) Field of Classification Search
CPC .......... G02B 27/646; G02B 9/12; G02B 9/34; G02B 9/60; G02B 9/62; G02B 15/1431; G02B 15/14; G02B 15/15; G02B 15/155; G02B 15/16; G02B 15/163; G02B 15/167; G02B 15/20; G02B 15/144111; G02B 15/173; G02B 9/64

(Continued)

(56) References Cited

U.S. PATENT DOCUMENTS 5,751,485 A * 5/1998 Suzuki ................. G02B 15/163
                                                        359/554
10,466,473 B2    11/2019 Gyoda et al.
(Continued)

FOREIGN PATENT DOCUMENTS

| JP | 2012-234169 A | 11/2012 |
|---|---|---|
| JP | 2012-242504 A | 12/2012 |

(Continued)

OTHER PUBLICATIONS

An Office Action; "Notice of Reasons for Refusal", mailed by the Japanese Patent Office dated Dec. 1, 2020, which corresponds to Japanese Patent Application No. 2018-035613 and is related to U.S. Appl. No. 16/286,131; with English language translation.

*Primary Examiner* — Kristina M Deherrera
(74) *Attorney, Agent, or Firm* — Studebaker & Brackett PC

(57) ABSTRACT

The imaging lens consists of, in order from an object side: a first lens group that has a positive refractive power; an aperture stop; a second lens group that has a positive refractive power; and a third lens group. The second lens group consists of two or less lenses, and moves to the object side during focusing from an object at infinity to an object at a closest distance. The third lens group includes, successively in order from at a position closest to an image side, a rear lens group that has a positive refractive power and a vibration reduction lens group that has a negative refractive power. Then, Conditional Expression (1) is satisfied.

$$-1.5 < f3ois/f3r < -0.85 \qquad (1)$$

16 Claims, 9 Drawing Sheets

(51) Int. Cl.
  *G02B 9/12* (2006.01)
  *G02B 9/62* (2006.01)
  *G02B 9/34* (2006.01)
  *G02B 9/60* (2006.01)
(52) U.S. Cl.
  CPC ............... *G02B 9/62* (2013.01); *G02B 9/64* (2013.01); *G02B 13/02* (2013.01); *G02B 15/1431* (2019.08); *G02B 15/144111* (2019.08)
(58) Field of Classification Search
  USPC ........................................................ 359/557
  See application file for complete search history.

(56) References Cited

U.S. PATENT DOCUMENTS

| | | | |
|---|---|---|---|
| 2016/0231545 A1* | 8/2016 | Machida | ............... G03B 13/36 |
| 2016/0252706 A1 | 9/2016 | Yamanaka et al. | |
| 2019/0265504 A1 | 8/2019 | Saito | |
| 2020/0026047 A1 | 1/2020 | Hosoi et al. | |

FOREIGN PATENT DOCUMENTS

| | | | |
|---|---|---|---|
| JP | 2016-161614 A | 9/2016 |
| JP | 2016-161643 A | 9/2016 |
| JP | 2016-161650 A | 9/2016 |
| JP | 2016-212288 A | 12/2016 |
| JP | 2017-215491 A | 12/2017 |
| JP | 2017-215492 A | 12/2017 |
| JP | 2019-152691 A | 9/2019 |
| WO | 2018/088038 A | 9/2019 |

* cited by examiner

EXAMPLE 1

EXAMPLE 2

INFINITY

CLOSE RANGE

EXAMPLE 3

INFINITY

CLOSE RANGE

EXAMPLE 4

INFINITY

CLOSE RANGE

IMAGING LENS AND IMAGING APPARATUS

CROSS REFERENCE TO RELATED APPLICATIONS

The present application claims priority under 35 U.S.C. § 119 to Japanese Patent Application No. 2018-035613 filed on Feb. 28, 2018. The above application is hereby expressly incorporated by reference, in its entirety, into the present application.

BACKGROUND OF THE INVENTION

1. Field of the Invention

The present invention relates to an imaging lens, which is particularly suitable for imaging apparatuses such as a digital camera, a lens interchangeable type digital camera, and a movie imaging camera, and an imaging apparatus comprising the imaging lens.

2. Description of the Related Art

In imaging lenses used in imaging apparatuses such as a digital camera, a lens interchangeable type digital camera, and a movie imaging camera, a super telephoto type imaging lens having an angle of view of 10° or less has been proposed in order to capture an image of a further distant object (for example, JP2016-161643A and JP2017-215491A).

SUMMARY OF THE INVENTION

In order to capture an image of a moving object with such a super telephoto type imaging lens, it is necessary to correct camera shaking more effectively by focusing at a higher speed. However, in a super telephoto type imaging lens in which the rays passing through the lens system becomes large, it is difficult to reduce the weight of both the focus lens group and the vibration reduction lens group. Further, in order to increase the shutter speed, it is necessary for a lens to have a small F number. However, in a case of using a lens with a small F number, the diameter of rays becomes large. As a result, it becomes further difficult to reduce the weight. In the imaging lenses of Examples 1 and 2 of JP2016-161643A, the reduction in weight of the vibration reduction lens group is not sufficient.

The present invention has been made in consideration of the above-mentioned situations, and an object of the present invention is to provide an imaging lens which has a small F number and in which weights of both the focus lens group and the vibration reduction lens group are reduced, and an imaging apparatus comprising the imaging lens.

An imaging lens of the embodiment of the present invention comprises, in order from an object side: a first lens group that has a positive refractive power; an aperture stop; a second lens group that has a positive refractive power; and a third lens group that has a refractive power. The second lens group consists of two or less lenses, and moves to the object side during focusing from an object at infinity to an object at a closest distance. The third lens group includes, successively in order from at a position closest to an image side, a rear lens group that has a positive refractive power and a vibration reduction lens group that has a negative refractive power and moves in a direction intersecting with an optical axis during image blur correction. In addition, assuming that a focal length of the vibration reduction lens group is f3ois, and a focal length of the rear lens group is f3r, Conditional Expression (1) is satisfied.

$$-1.5 < f3ois/f3r < -0.85 \tag{1}$$

It is more preferable to satisfy Conditional Expression (1-1).

$$-1.2 < f3ois/f3r < -0.88 \tag{1-1}$$

In the imaging lens of the embodiment of the present invention, assuming that a focal length of a whole system is f, and a focal length of the third lens group is f3, it is preferable to satisfy Conditional Expression (2). It is more preferable to satisfy Conditional Expression (2-1).

$$-0.32 < f/f3 < 0.3 \tag{2}$$

$$-0.3 < f/f3 < 0.1 \tag{2-1}$$

Further, assuming that a distance on the optical axis from a surface closest to the image side in the second lens group to a surface closest to the object side in the vibration reduction lens group is D2o, and a distance on the optical axis from a surface closest to the object side in the first lens group to an image plane is L, it is preferable to satisfy Conditional Expression (3). It is more preferable to satisfy Conditional Expression (3-1).

$$0.04 < D2o/L < 0.1 \tag{3}$$

$$0.05 < D2o/L < 0.08 \tag{3-1}$$

Further, the vibration reduction lens group includes a positive lens and a negative lens. Assuming that an Abbe number of the positive lens included in the vibration reduction lens group at a d line is νdop, it is preferable that at least one positive lens of the positive lens included in the vibration reduction lens group satisfies Conditional Expression (4). It is more preferable to satisfy Conditional Expression (4-1).

$$\nu dop < 20 \tag{4}$$

$$10 < \nu dop < 20 \tag{4-1}$$

Further, it is preferable that at least one negative lens is provided between the second lens group and the vibration reduction lens group.

Further, it is preferable that the rear lens group includes at least four lenses.

Further, it is preferable that the rear lens group includes, successively in order from at a position closest to the object side, a positive lens and a negative lens.

Further, it is preferable that the first lens group includes, successively in order from at the position closest to the image side, a negative lens and a positive lens with an air gap interposed therebetween.

Further, it is preferable that the first lens group includes, successively in order from at a position closest to the object side, a positive lens, a positive lens, and a cemented lens in which a positive lens and a negative lens are cemented in order from the object side.

Further, assuming that an Abbe number of the lens closest to the object side in the first lens group at a d line is νd1, it is preferable to satisfy Conditional Expression (5). It is more preferable to satisfy Conditional Expression (5-1).

$$10 < \nu d1 < 43 \tag{5}$$

$$15 < \nu d1 < 38 \tag{5-1}$$

An imaging apparatus of the embodiment of the present invention comprises the above-mentioned imaging lens of the embodiment of the present invention.

It should be noted that the term "consists of ~" means that the imaging lens may include not only the above-mentioned elements but also lenses substantially having no powers (refractive powers), optical elements, which are not lenses, such as a stop, a mask, a cover glass, and a filter, and mechanism parts such as a lens flange, a lens barrel, an imaging element, and a camera shaking correction mechanism.

Further, the focal length in each conditional expression is set as a value during focusing on the object at infinity. Further, surface shapes, signs of refractive powers, radii of curvature of the lenses are assumed as those in paraxial regions in a case where some lenses have aspheric surfaces.

The imaging lens of the embodiment of the present invention consists of, in order from an object side: a first lens group that has a positive refractive power; an aperture stop; a second lens group that has a positive refractive power; and a third lens group that has a refractive power. The second lens group consists of two or less lenses, and moves to the object side during focusing from an object at infinity to an object at a closest distance. The third lens group comprises, successively in order from at a position closest to an image side, a rear lens group that has a positive refractive power and a vibration reduction lens group that has a negative refractive power and moves in a direction intersecting with an optical axis during image blur correction. In addition, assuming that a focal length of the vibration reduction lens group is f3ois, and a focal length of the rear lens group is f3r, Conditional Expression (1) is satisfied. Therefore, it is possible to provide an imaging lens which has a small F number and in which weights of both the focus lens group and the vibration reduction lens group are reduced, and an imaging apparatus comprising the imaging lens.

$$-1.5 < f3ois/f3r < -0.85 \quad (1)$$

DESCRIPTION OF THE PREFERRED EMBODIMENTS

Figure 1:
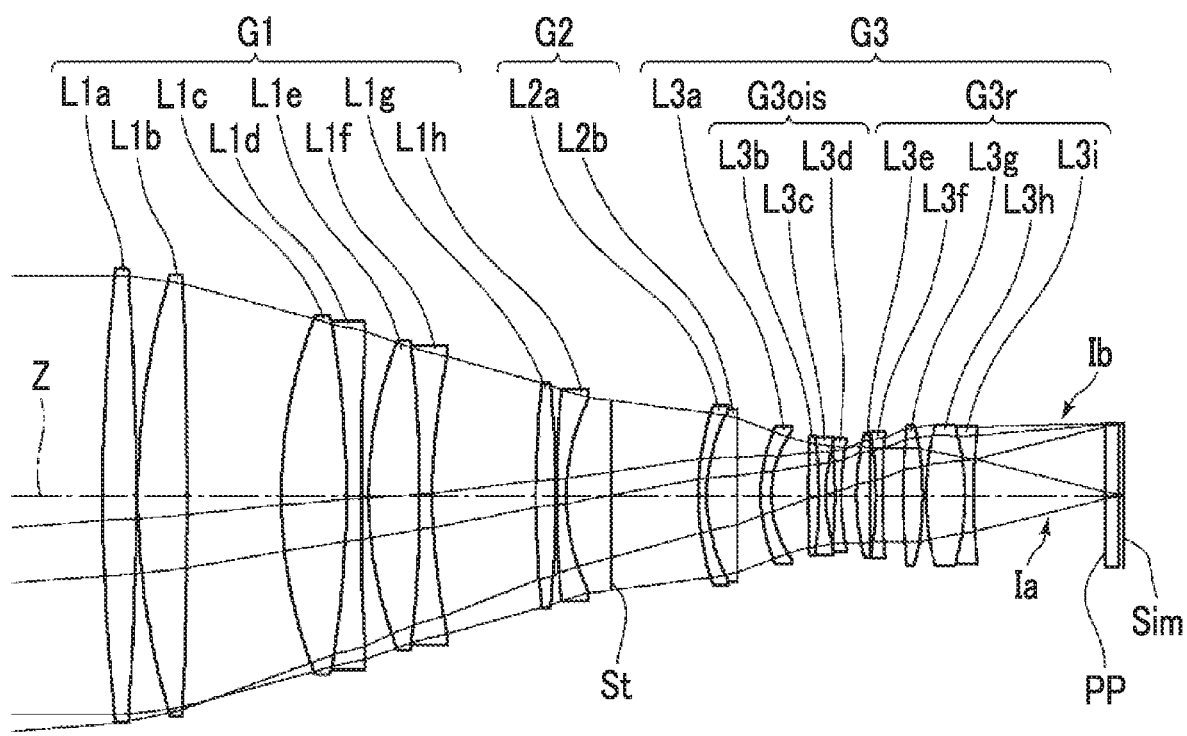
FIG. 1 is a cross-sectional view illustrating a lens configuration of an imaging lens (common to Example 1) according to an embodiment of the present invention.
Figure 1:
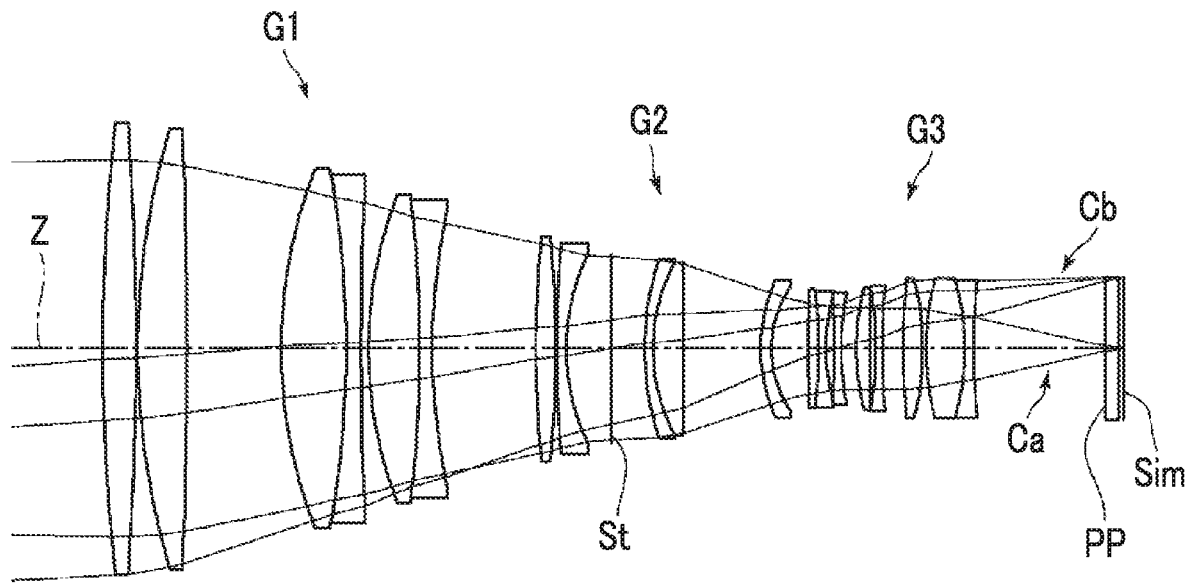

Hereinafter, an embodiment of the present invention will be described in detail with reference to the drawing. FIG. 1 is a cross-sectional view illustrating a lens configuration of an imaging lens according to an embodiment of the present invention. The exemplary configuration shown in FIG. 1 is the same as the configuration of the imaging lens of Example 1 to be described later. In FIG. 1, the left side is an object side, and the right side is an image side. In addition, an aperture stop St shown in the drawing does not necessarily show its real size and shape, but show a position on an optical axis Z. The upper side of FIG. 1 shows a state where the object at infinity is in focus, and additionally shows on-axis rays Ia and rays with the maximum angle of view Ib. The lower side of FIG. 1 shows a state where the close-range object is in focus, and additionally shows on-axis rays Ca and rays with the maximum angle of view Cb.

In order to mount the imaging lens on an imaging apparatus, it is preferable to provide various filters and/or a protective cover glass based on specification of the imaging apparatus. Thus, FIG. 1 shows an example where a plane-parallel-plate-like optical member PP, in which those are considered, is disposed between the lens system and the image plane Sim. However, a position of the optical member PP is not limited to that shown in FIG. 1, and it is also possible to adopt a configuration in which the optical member PP is omitted.

The imaging lens of the present embodiment is composed of, in order from the object side, a first lens group G1 having a positive refractive power, an aperture stop St, a second lens group G2 having a positive refractive power, and a third lens group G3 having a refractive power.

The second lens group G2, which is a focus lens group, consists of two or less lenses, and moves toward the object side during focusing from an object at infinity to an object at the closest distance.

The third lens group G3 comprises, successively in order from at a position closest to an image side, a rear lens group G3r that has a positive refractive power and a vibration reduction lens group G3ois that has a negative refractive power and moves in a direction intersecting with an optical axis during image blur correction.

By disposing the aperture stop St at a position closer to the image side than the first lens group G1 in this manner, the diameter of the aperture stop St can be reduced. As a result, there is an advantage in reducing the overall diameter of the lens barrel.

In addition, by forming the first lens group G1 as a group having a positive refractive power, the diameter of the lens at a position closer to the image side than the first lens group G1 can be made small. As a result, there is an advantage in reducing the weight.

In addition, by forming the second lens group G2 as a group having a positive refractive power, it is possible to reduce the diameter of the lens at a position closer to the image side than the second lens group G2. As a result, there is an advantage in reducing the weight. In addition, by making the second lens group G2 composed of two or less lenses, it is possible to reduce the weight of the second lens group G2. As a result, there is an advantage in increasing the focusing speed. Furthermore, by moving the second lens group G2 to the object side during focusing from the object at infinity to the object at the closest distance, the second lens group G2 is located on the image side during focusing on the object at infinity. Therefore, the diameter of the rays passing through the second lens group G2 during focusing on the object at infinity becomes small. As a result, there is an advantage in reducing the weight of the second lens group G2.

Further, by disposing the vibration reduction lens group G3ois at a position closer to the image side than the second lens group G2 having a positive refractive power in the third lens group G3, the diameter of the rays passing through the vibration reduction lens group G3ois can be reduced. As a result, there is an advantage in reducing the weight of the vibration reduction lens group G3ois. Further, by disposing the rear lens group G3r having a positive refractive power on the image side of the vibration reduction lens group G3ois, the negative refractive power of the vibration reduction lens group G3ois can be increased.

Therefore, it is possible to suppress an amount of movement during the vibration reduction operation.

Further, assuming that a focal length of the vibration reduction lens group G3ois is f3ois and a focal length of the rear lens group G3r is f3r, the imaging lens of the present embodiment is configured to satisfy Conditional Expression (1).

$$-1.5 < f3ois/f3r < -0.85 \qquad (1)$$

By not allowing the result of Conditional Expression (1) to be equal to or greater than the upper limit, it is possible to ensure the refractive power of the rear lens group G3r and suppress the height of the off-axis ray passing through the surface closest to the image side in the vibration reduction lens group G3ois. As a result, there is an advantage in reducing the effective diameter and reducing the weight of the vibration reduction lens group G3ois. Further, it is possible to increase the effective diameters of the first lens group G1 and the second lens group G2 while reducing the size of the vibration reduction lens group G3ois. As a result, there is an advantage in reducing the F number. By not allowing the result of Conditional Expression (1) to be equal to or less than the lower limit, it is possible to ensure the refractive power of the vibration reduction lens group G3ois and to suppress the amount of movement during the vibration reduction operation. Therefore, a driving mechanism therefor can be miniaturized. In addition, in a case where Conditional Expression (1-1) is satisfied, it is possible to obtain more favorable characteristics.

$$-1.2 < f3ois/f3r < -0.88 \qquad (1-1)$$

In the imaging lens of the present embodiment, assuming that a focal length of a whole system is f and a focal length of the third lens group G3 is f3, it is preferable to satisfy Conditional Expression (2). By not allowing the result of Conditional Expression (2) to be equal to or greater than the upper limit, the positive refractive power of the third lens group G3 can be suppressed, and the positive refractive power of the second lens group G2 can be increased. Therefore, it is possible to suppress the amount of movement of the second lens group G2 during focusing. As a result, there is an advantage in shortening the total length of the lens system and achieving reduction in size. By not allowing the result of Conditional Expression (2) to be equal to or less than the lower limit, it is possible to suppress the negative refractive power of the third lens group G3 and suppress the diameter of the rays passing through the second lens group G2. Therefore, there is an advantage in reducing the weight of the second lens group G2. In addition, in a case where Conditional Expression (2-1) is satisfied, it is possible to obtain more favorable characteristics.

$$-0.32 < f/f3 < 0.3 \qquad (2)$$

$$-0.3 < f/f3 < 0.1 \qquad (2-1)$$

Further, assuming that a distance on the optical axis from a surface closest to the image side in the second lens group G2 to a surface closest to the object side in the vibration reduction lens group G3ois is D2o and a distance on the optical axis from a surface closest to the object side in the first lens group G1 to the image plane Sim is L, it is preferable to satisfy Conditional Expression (3). By not allowing the result of Conditional Expression (3) to be equal to or greater than the upper limit, it is possible to prevent the space between the second lens group G2 and the vibration reduction lens group G3ois from being excessively increased. Therefore, it is possible to shorten the total length of the lens system and achieve reduction in size. By not allowing the result of Conditional Expression (3) to be equal to or less than the lower limit, the rays emitted from the focus lens group (the second lens group G2) having the positive refractive power sufficiently converges and then enters the vibration reduction lens group G3ois. Therefore, it is possible to suppress the diameter of the rays passing through the vibration reduction lens group G3ois. As a result, there is an advantage in reducing the weight of the vibration reduction lens group G3ois. Further, it is possible to increase the effective diameters of the first lens group G1 and the second lens group G2 while reducing the size of the vibration reduction lens group G3ois. As a result, there is an advantage in reducing the F number. In addition, in a case where Conditional Expression (3-1) is satisfied, it is possible to obtain more favorable characteristics.

$$0.04 < D2o/L < 0.1 \qquad (3)$$

$$0.05 < D2o/L < 0.08 \qquad (3-1)$$

Further, the vibration reduction lens group G3ois comprises a positive lens and a negative lens. Assuming that an Abbe number of the positive lens included in the vibration reduction lens group G3ois at a d line is vdop, it is preferable that at least one positive lens of the positive lens included in the vibration reduction lens group G3ois satisfies Conditional Expression (4). By disposing both the positive lens and the negative lens in the vibration reduction lens group G3ois, fluctuation in chromatic aberration during the vibration reduction operation can be suppressed. By not allowing the result of Conditional Expression (4) to be equal to or greater than the upper limit, there is an advantage in correcting chromatic aberration during the vibration reduction operation. In addition, in a case where Conditional Expression (4-1) is satisfied, it is possible to obtain more favorable characteristics. By not allowing the result of Conditional Expression (4-1) to be equal to or less than the lower limit, it is possible to suppress occurrence of the secondary chromatic aberration.

$$vdop < 20 \qquad (4)$$

$$10 < vdop < 20 \qquad (4-1)$$

Further, it is preferable that at least one negative lens is provided between the second lens group G2 and the vibration reduction lens group G3ois. With such a configuration, there is an advantage in suppressing fluctuation in spherical aberration during focusing.

Further, it is preferable that the rear lens group G3r comprises at least four lenses. With such a configuration, there is an advantage in suppressing field curvature.

Further, it is preferable that the rear lens group G3r comprises, successively in order from at a position closest to the object side, a positive lens and a negative lens. With such a configuration, there is an advantage in correcting lateral chromatic aberration.

Further, it is preferable that the first lens group G1 comprises, successively in order from at the position closest to the image side, a negative lens and a positive lens with an air gap interposed therebetween. With such a configuration, the curvatures of the image side surface of the positive lens and the object side surface of the negative lens can be appropriately set. As a result, there is an advantage in suppressing the spherical aberration.

Further, it is preferable that the first lens group G1 comprises, successively in order from at the position closest to the object side, a positive lens, a positive lens, and a cemented lens in which a positive lens and a negative lens are cemented in order from the object side. With such a configuration, it is possible to suppress longitudinal chromatic aberration while converting the rays into convergent light.

Further, assuming that an Abbe number of the lens closest to the object side in the first lens group G1 at the d line is vd1, it is preferable to satisfy Conditional Expression (5). By satisfing Conditional Expression (5), secondary chromatic aberration can be appropriately corrected. In addition, in a case where Conditional Expression (5-1) is satisfied, it is possible to obtain more favorable characteristics.

$$10<vd1<43 \quad (5)$$

$$15<vd1<38 \quad (5-1)$$

In the example shown in FIG. 1, the optical member PP is disposed between the lens system and the image plane Sim. However, various filters such as a lowpass filter and a filter for cutting off a specific wavelength region may not be disposed between the lens system and the image plane Sim. Instead, such various filters may be disposed between the lenses, or coating for functions the same as those of various filters may be performed on a lens surface of any lens.

Next, numerical examples of the imaging lens of the embodiment of the present invention will be described. First, the imaging lens of Example 1 will be described. FIG. 1 is a cross-sectional view illustrating a lens configuration of the imaging lens of Example 1. In FIG. 1 and FIGS. 2 to 4 corresponding to Examples 2 to 4 to be described later, left sides thereof are the object side, and right sides thereof are the image side. In addition, the aperture stop St shown in the drawings does not necessarily indicate its size or shape, and indicates a position thereof on the optical axis Z. The upper side of FIG. 1 shows a state where the object at infinity is in focus, and additionally shows on-axis rays Ia and rays with the maximum angle of view Ib. The lower side of FIG. 1 shows a state where the close-range object is in focus, and additionally shows on-axis rays Ca and rays with the maximum angle of view Cb.

The imaging lens of Example 1 is composed of, in order from the object side, a first lens group G1 composed of eight lenses L1a to L1h, an aperture stop St, a second lens group G2 composed of two lenses L2a and L2b, and a third lens group G3 composed of nine lenses L3a to L3i. In the third lens group G3, the vibration reduction lens group G3ois is composed of three lenses L3b to L3d, and the rear lens group G3r is composed of five lenses L3e to L3i.

Table 1 shows basic lens data of the imaging lens of Example 1, Table 2 shows data about specification, and Table 3 shows data about variable surface distances. Hereinafter, meanings of the reference signs in the tables are, for example, as described in Example 1, and are basically the same as those in Examples 2 to 4.

In the lens data of Table 1, the column of the surface number shows surface numbers. The surface of the elements closest to the object side is the first surface, and the surface numbers sequentially increase toward the image plane side. The column of the radius of curvature shows radii of curvature of the respective surfaces. The column of the surface distance shows distances on the optical axis Z between the respective surfaces and the subsequent surfaces. Further, the column of n shows a refractive index of each optical element at the d line (a wavelength of 587.6 nm (nanometers)), the column of ν shows an Abbe number of each optical element at the d line (a wavelength of 587.6 nm (nanometers)), and the column of θgF shows a partial dispersion ratio of each optical element.

It should be noted that a partial dispersion ratio θgF is represented by the following expression.

$$θgF=(ng-nF)/(nF-nC)$$

Here, ng is a refractive index at the g line, nF is a refractive index at the F line, and nC is a refractive index at the C line.

In addition, the sign of the radius of curvature is positive in a case where a surface has a shape convex toward the object side, and is negative in a case where a surface has a shape convex toward the image plane side. In the basic lens data, the aperture stop St and the optical member PP are additionally noted. In a place of a surface number of a surface corresponding to the aperture stop St, the surface number and a term of (stop) are noted. Further, in the lens data of Table 1, in each place of the surface distance which is variable during focusing, DD[surface number] is noted. Numerical values each corresponding to the DD[surface number] are shown in Table 3.

In the data about the specification of Table 2, values of the focal length f, the F number FNo, and the total angle of view 2ω(°) are noted.

In the basic lens data, the data about specification, and the data about variable surface distances, "°" is used as a unit of an angle, and mm (millimeters) is used as a unit of a length, but appropriate different units may be used since the lens system can be used even in a case where the system is enlarged or reduced in proportion.

TABLE 1

Example 1 • Lens Data (n and ν are based on d line)

| Surface Number | Radius of Curvature | Surface Distance | n | ν | θgf |
|---|---|---|---|---|---|
| 1 | 430.7013 | 7.0700 | 1.67270 | 32.10 | 0.59891 |
| 2 | −727.3321 | 0.4562 | | | |
| 3 | 165.9720 | 10.7500 | 1.43875 | 94.66 | 0.53402 |
| 4 | −1120.2835 | 20.2132 | | | |
| 5 | 105.9369 | 13.9100 | 1.49700 | 81.54 | 0.53748 |
| 6 | −218.3400 | 3.1600 | 1.83481 | 42.74 | 0.56490 |
| 7 | 775.7212 | 1.6106 | | | |
| 8 | 91.4829 | 11.0200 | 1.49700 | 81.54 | 0.53748 |
| 9 | −267.5300 | 2.7200 | 1.91082 | 35.25 | 0.58224 |
| 10 | 141.8275 | 22.2150 | | | |

TABLE 1-continued

Example 1 • Lens Data (n and ν are based on d line)

| Surface Number | Radius of Curvature | Surface Distance | n | ν | θgf |
|---|---|---|---|---|---|
| 11 | 266.7587 | 4.1100 | 1.80809 | 22.76 | 0.63073 |
| 12 | −266.7587 | 0.3002 | | | |
| 13 | 266.7635 | 2.0000 | 1.80000 | 29.84 | 0.60178 |
| 14 | 47.2925 | 9.4871 | | | |
| 15 (Stop) | ∞ | DD[15] | | | |
| 16 | 61.1684 | 1.8100 | 1.54814 | 45.78 | 0.56859 |
| 17 | 39.3800 | 6.6000 | 1.69680 | 55.53 | 0.54341 |
| 18 | ∞ | DD[18] | | | |
| 19 | 36.1305 | 2.3000 | 1.60342 | 38.03 | 0.58356 |
| 20 | 23.9164 | 7.9000 | | | |
| 21 | 415.3848 | 2.2800 | 1.95906 | 17.47 | 0.65993 |
| 22 | −91.4760 | 1.5100 | 1.73400 | 51.47 | 0.54874 |
| 23 | 42.9219 | 1.8900 | | | |
| 24 | −217.2372 | 1.4000 | 1.80100 | 34.97 | 0.58642 |
| 25 | 66.6268 | 3.2077 | | | |
| 26 | 51.5518 | 3.1100 | 1.90366 | 31.31 | 0.59481 |
| 27 | ∞ | 1.0602 | | | |
| 28 | −77.9583 | 1.4000 | 1.80809 | 22.76 | 0.63073 |
| 29 | 145.8634 | 4.4301 | | | |
| 30 | 133.6002 | 4.2800 | 1.80610 | 40.93 | 0.57141 |
| 31 | −60.7409 | 0.6043 | | | |
| 32 | 53.2520 | 8.6300 | 1.65412 | 39.73 | 0.57369 |
| 33 | −53.2520 | 1.9000 | 1.80000 | 29.84 | 0.60178 |
| 34 | 154.3014 | 28.1625 | | | |
| 35 | ∞ | 2.8500 | 1.51680 | 64.20 | 0.53430 |
| 36 | ∞ | 1.1000 | | | |

TABLE 2

Example 1 • Specification (d Line)

| | Infinity | Close Range (1.57 m) |
|---|---|---|
| f | 194.01 | 181.53 |
| FNo. | 2.06 | 2.33 |
| 2ω [°] | 9.0 | 8.2 |

TABLE 3

Example 1 • Variable Surface Distance

| | Infinity | Close Range (1.57 m) |
|---|---|---|
| DD[15] | 18.63 | 7.08 |
| DD[18] | 4.92 | 16.47 |

Figure 5:
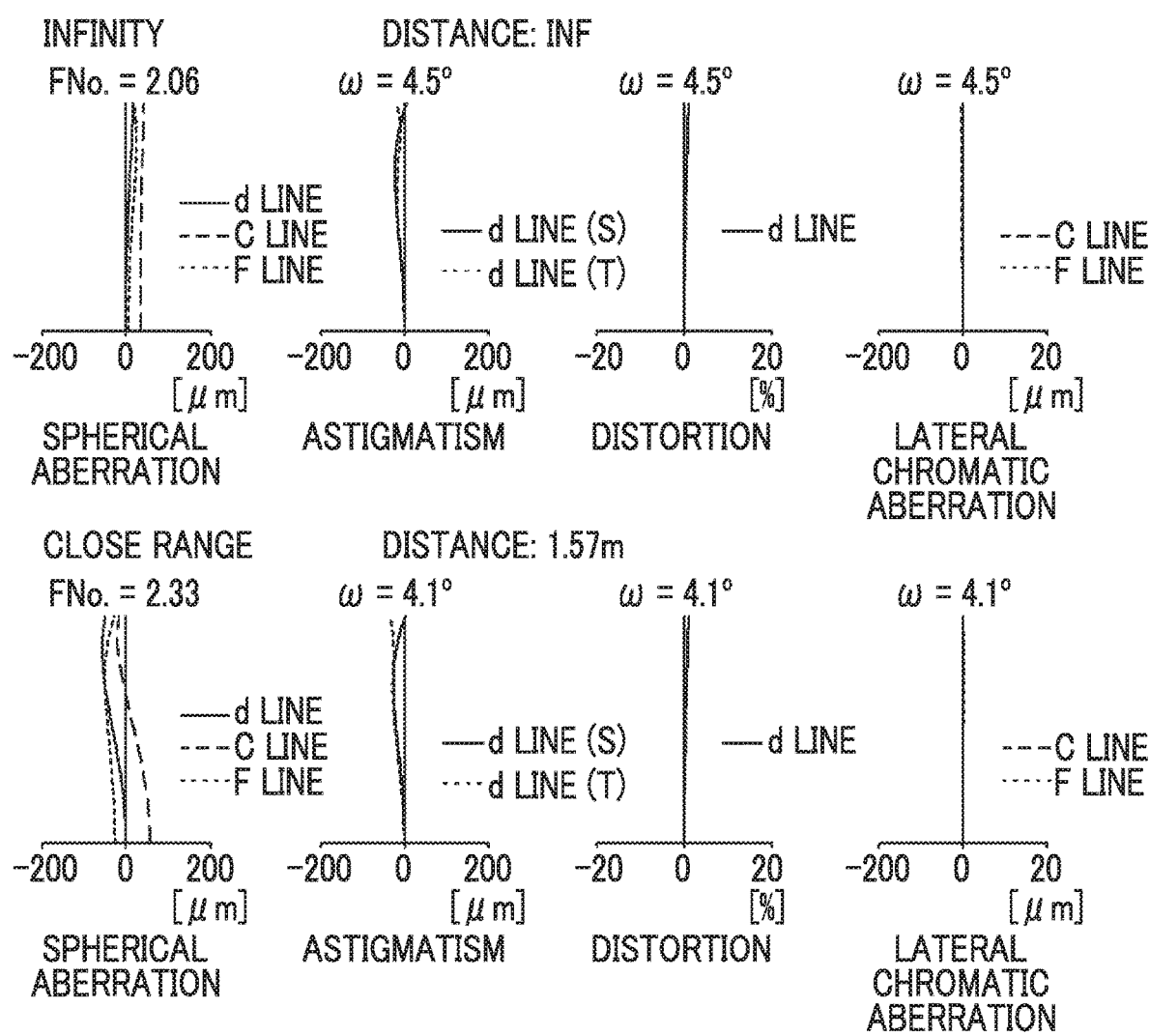
FIG. 5 is a diagram of aberrations of the imaging lens of Example 1 of the present invention.

FIG. 5 shows a diagram of aberrations of the imaging lens of Example 1. In FIG. 5, spherical aberration, astigmatism, distortion, and lateral chromatic aberration during focusing the object at infinity are shown in order from the upper left side, and spherical aberration, astigmatism, distortion, and lateral chromatic aberration during focusing on the close-range (1.57 m (meters)) object are shown in order from the lower left side. Each aberration diagram shows aberration at the d line (a wavelength of 587.6 nm (nanometers)) which is set as a reference wavelength. In the spherical aberration diagram, aberrations at the d line (a wavelength of 587.6 nm (nanometers)), the C line (a wavelength of 656.3 nm (nanometers)), and the F line (a wavelength of 486.1 nm (nanometers)) are respectively indicated by the solid line, the long dashed line, and the short dashed line. In the astigmatism diagram, aberrations in sagittal and tangential directions are respectively indicated by the solid line and the short dashed line. In the lateral chromatic aberration, aberrations at the C line (a wavelength of 656.3 nm (nanometers)) and F line (a wavelength of 486.1 nm (nanometers)) are respectively indicated by the long dashed line and the short dashed line. In addition, in the spherical aberration diagram, FNo. means an F number. In the other aberration diagrams, ω means a half angle of view.

Figure 2:
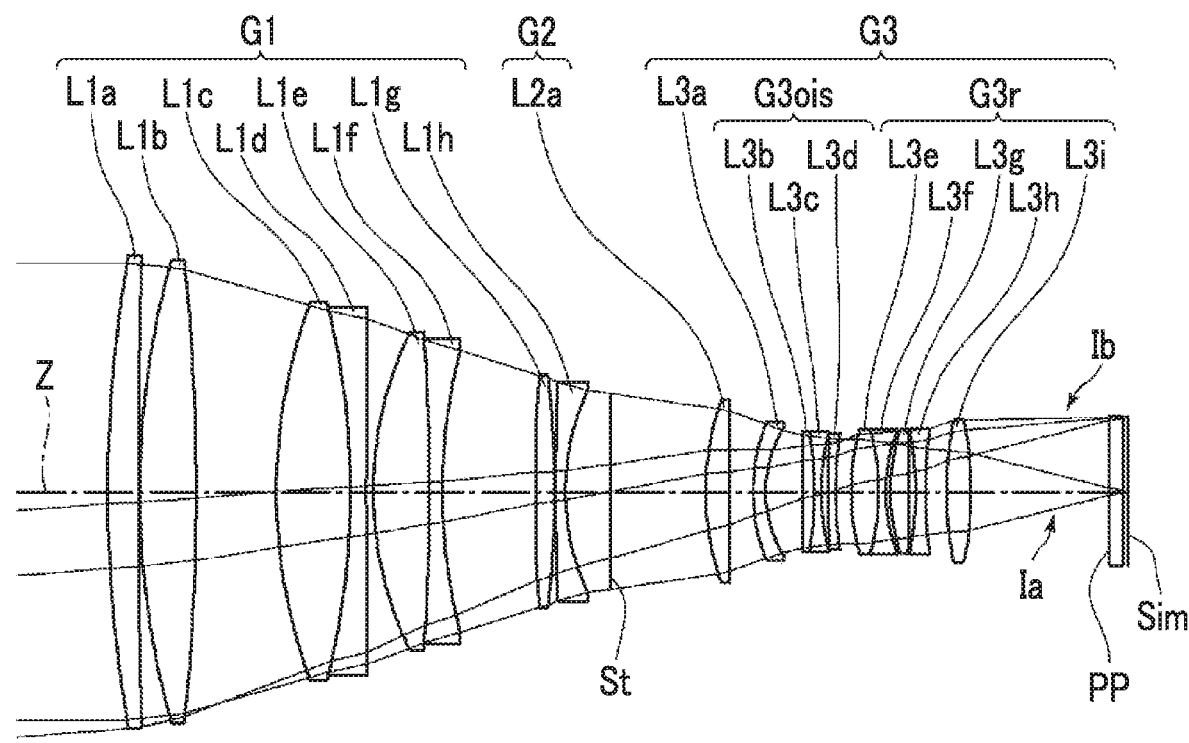
FIG. 2 is a cross-sectional view illustrating a lens configuration of an imaging lens of Example 2 of the present invention.
Figure 2:
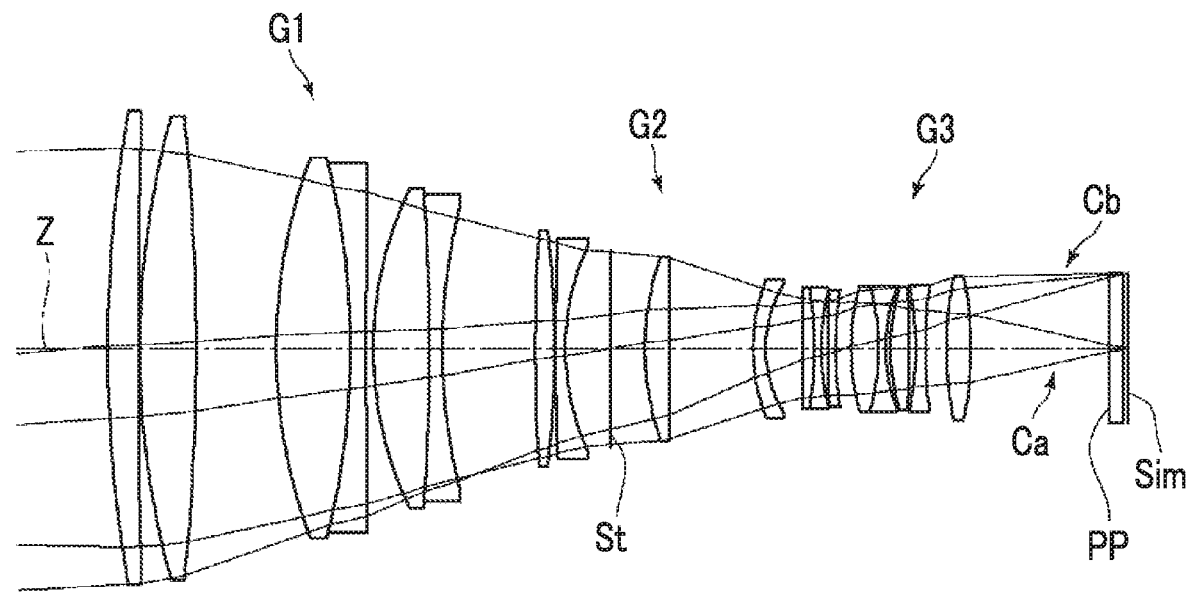
Figure 6:
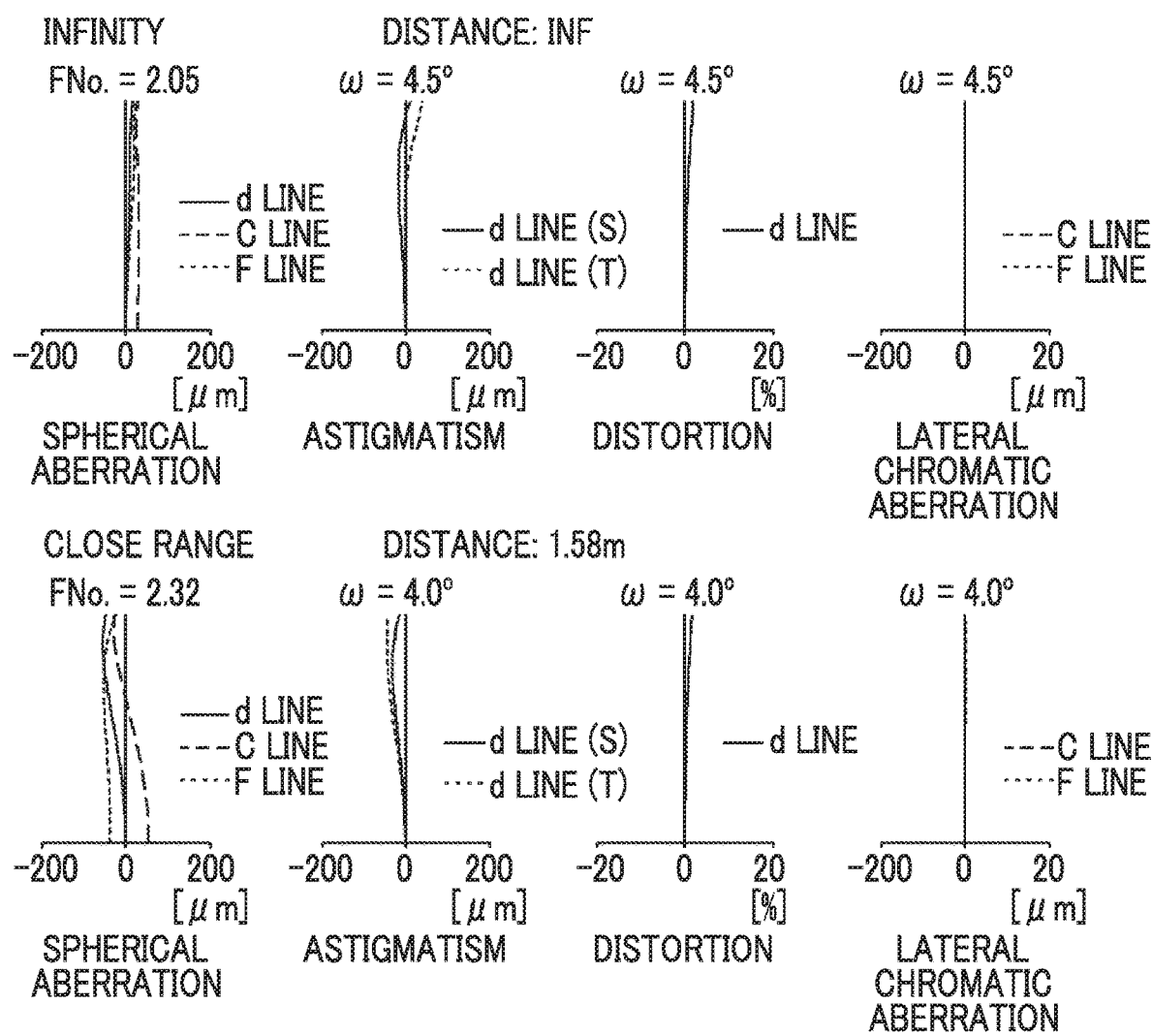
FIG. 6 is a diagram of aberrations of the imaging lens of Example 2 of the present invention.

Next, an imaging lens of Example 2 will be described. FIG. 2 is a cross-sectional view illustrating a lens configuration of the imaging lens of Example 2. The group configuration of the imaging lens of Example 2 is the same as the imaging lens of Example 1 except that the second lens group G2 is composed of only one lens L2a. Further, Table 4 shows basic lens data of the imaging lens of Example 2, Table 5 shows data about specification, and Table 6 shows data about variable surface distances. FIG. 6 shows aberration diagrams thereof during focusing on the object at infinity and aberration diagrams thereof during focusing on the close-range (1.58 m (meters)) object.

TABLE 4

Example 2 • Lens Data (n and ν are based on d line)

| Surface Number | Radius of Curvature | Surface Distance | n | ν | θgf |
|---|---|---|---|---|---|
| 1 | 281.2593 | 6.3629 | 1.75520 | 27.51 | 0.61033 |
| 2 | 2438.6986 | 0.1998 | | | |
| 3 | 179.0364 | 11.8394 | 1.43875 | 94.66 | 0.53402 |
| 4 | −467.3399 | 16.4487 | | | |
| 5 | 112.9579 | 15.2533 | 1.49700 | 81.54 | 0.53748 |
| 6 | −158.2489 | 3.1692 | 1.83481 | 42.72 | 0.56486 |
| 7 | 3858.0241 | 1.4998 | | | |
| 8 | 75.7081 | 11.5198 | 1.49700 | 81.54 | 0.53748 |
| 9 | −472.5613 | 2.6713 | 1.91082 | 35.25 | 0.58224 |
| 10 | 117.3523 | 19.0647 | | | |
| 11 | 386.2243 | 3.9211 | 1.80809 | 22.76 | 0.63073 |
| 12 | −228.3100 | 0.2998 | | | |
| 13 | 510.7042 | 1.9998 | 1.80000 | 29.84 | 0.60178 |
| 14 | 50.4368 | 9.1114 | | | |
| 15 (Stop) | ∞ | DD[15] | | | |
| 16 | 57.4626 | 4.8476 | 1.67790 | 55.34 | 0.54726 |
| 17 | ∞ | DD[17] | | | |
| 18 | 38.4414 | 2.6103 | 1.80809 | 22.76 | 0.63073 |
| 19 | 25.7549 | 7.5893 | | | |
| 20 | ∞ | 2.3072 | 1.95906 | 17.47 | 0.65993 |
| 21 | −80.7940 | 1.5098 | 1.73400 | 51.47 | 0.54874 |
| 22 | 49.5562 | 1.5195 | | | |
| 23 | 1271.6918 | 1.3999 | 1.84666 | 23.78 | 0.62054 |
| 24 | 75.2976 | 3.1998 | | | |
| 25 | 48.2673 | 5.6809 | 1.75700 | 47.82 | 0.55662 |
| 26 | −45.8385 | 1.4098 | 1.48749 | 70.44 | 0.53062 |
| 27 | 34.1075 | 0.9999 | | | |
| 28 | 41.4424 | 3.6327 | 1.85026 | 32.27 | 0.59299 |
| 29 | −1307.3710 | 1.5401 | | | |
| 30 | −64.3145 | 1.9999 | 1.80518 | 25.42 | 0.61616 |
| 31 | 90.1776 | 4.6289 | | | |
| 32 | 79.7092 | 5.0240 | 1.65412 | 39.68 | 0.57378 |
| 33 | −67.0533 | 28.4110 | | | |
| 34 | ∞ | 2.8500 | 1.51680 | 64.20 | 0.53430 |
| 35 | ∞ | 1.1000 | | | |

TABLE 5

Example 2 • Specification (d Line)

|  | Infinity | Close Range (1.58 m) |
|---|---|---|
| f | 194.00 | 182.57 |
| FNo. | 2.05 | 2.32 |
| 2ω [°] | 9.0 | 8.0 |

TABLE 6

Example 2 • Variable Surface Distance

|  | Infinity | Close Range (1.58 m) |
|---|---|---|
| DD[15] | 19.50 | 7.03 |
| DD[17] | 4.90 | 17.37 |

Figure 3:
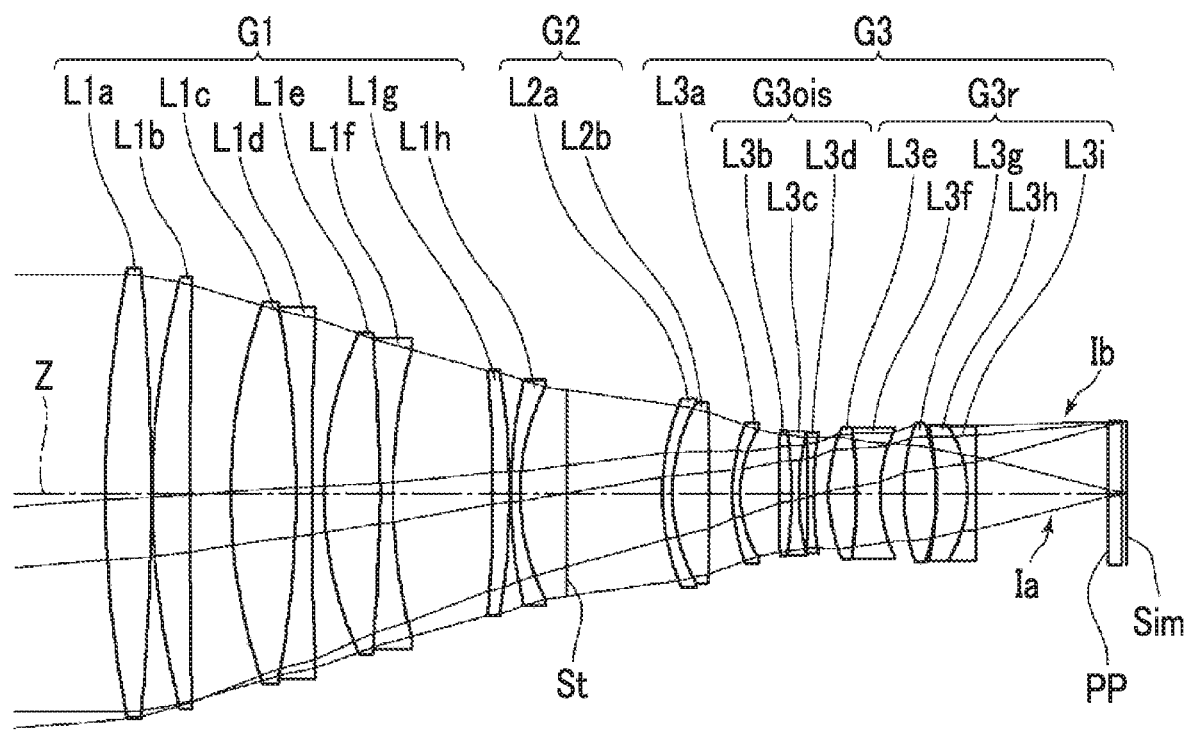
FIG. 3 is a cross-sectional view illustrating a lens configuration of an imaging lens of Example 3 of the present invention.
Figure 3:
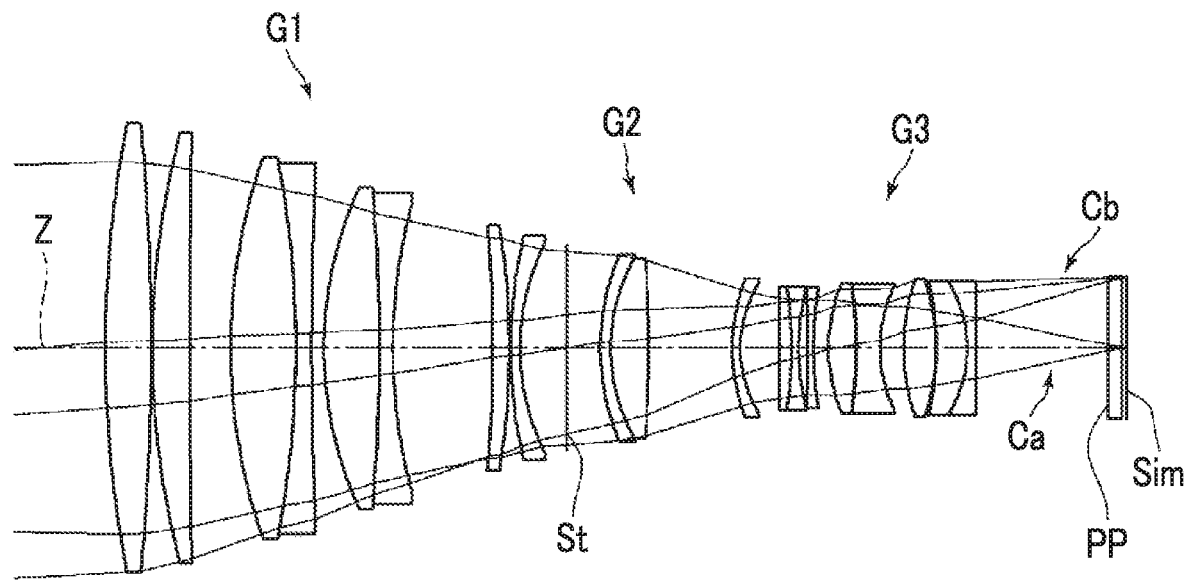
Figure 7:
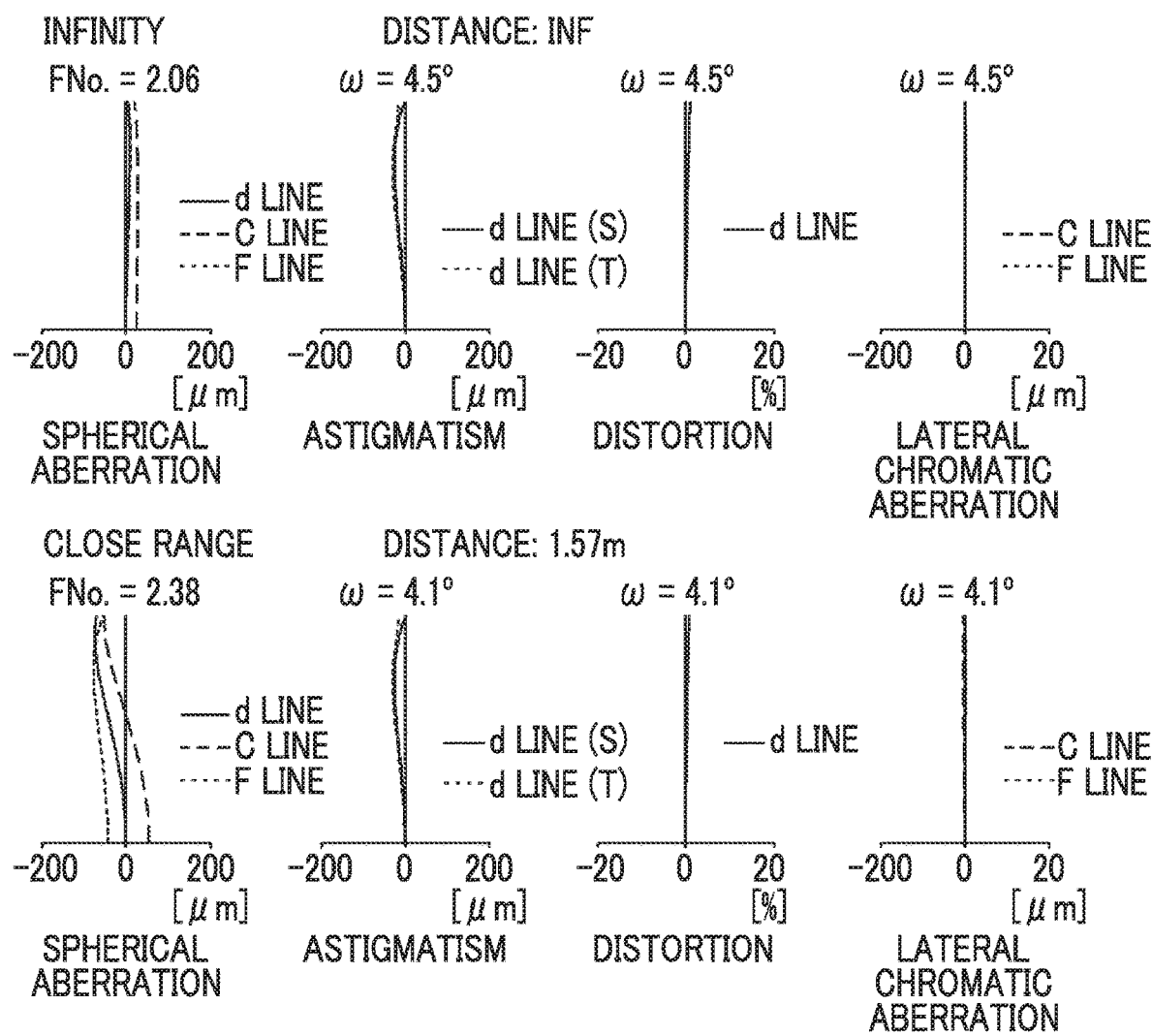
FIG. 7 is a diagram of aberrations of the imaging lens of Example 3 of the present invention.

Next, an imaging lens of Example 3 will be described. FIG. 3 is a cross-sectional view illustrating a lens configuration of the imaging lens of Example 3. The group configuration of the imaging lens of Example 3 is the same as the imaging lens of Example 1. Further, Table 7 shows basic lens data of the imaging lens of Example 3, Table 8 shows data about specification, and Table 9 shows data about variable surface distances. FIG. 7 shows aberration diagrams thereof during focusing on the object at infinity and aberration diagrams thereof during focusing on the close-range (1.57 m (meters)) object.

TABLE 7

Example 3 • Lens Data (n and ν are based on d line)

| Surface Number | Radius of Curvature | Surface Distance | n | ν | θgf |
|---|---|---|---|---|---|
| 1 | 252.0494 | 9.8962 | 1.62588 | 35.70 | 0.58935 |
| 2 | −515.9847 | 0.1998 | | | |
| 3 | 181.5973 | 8.4802 | 1.43387 | 95.18 | 0.53733 |
| 4 | 3607.5955 | 8.5933 | | | |
| 5 | 124.9313 | 14.0837 | 1.49700 | 81.54 | 0.53748 |
| 6 | −215.0537 | 3.3343 | 1.83481 | 42.72 | 0.56486 |
| 7 | 840.9410 | 2.7045 | | | |
| 8 | 83.3042 | 11.9492 | 1.49700 | 81.54 | 0.53748 |
| 9 | −400.8617 | 2.8416 | 1.91082 | 35.25 | 0.58224 |
| 10 | 119.6849 | 21.4964 | | | |
| 11 | −324.6320 | 3.5998 | 1.80809 | 22.76 | 0.63073 |
| 12 | −168.4377 | 0.3000 | | | |
| 13 | 105.1594 | 2.0001 | 1.83481 | 42.74 | 0.56490 |
| 14 | 50.6766 | 10.0397 | | | |
| 15 (Stop) | ∞ | DD[15] | | | |
| 16 | 52.2700 | 2.2077 | 1.51742 | 52.43 | 0.55649 |
| 17 | 39.7936 | 8.0002 | 1.48749 | 70.44 | 0.53062 |
| 18 | −399.3433 | DD[18] | | | |
| 19 | 42.8701 | 1.6998 | 1.80809 | 22.76 | 0.63073 |
| 20 | 27.2242 | 8.5002 | | | |
| 21 | 2006.0214 | 2.5511 | 1.95906 | 17.47 | 0.65993 |
| 22 | −81.5346 | 1.5098 | 1.73400 | 51.47 | 0.54874 |
| 23 | 54.0462 | 1.8541 | | | |
| 24 | −649.2442 | 1.4000 | 1.85478 | 24.80 | 0.61232 |
| 25 | 97.5423 | 3.1999 | | | |
| 26 | 37.4736 | 5.7159 | 1.89190 | 37.13 | 0.57813 |
| 27 | −116.6064 | 0.3851 | | | |
| 28 | −81.2653 | 4.9385 | 1.64769 | 33.79 | 0.59393 |
| 29 | 31.4083 | 5.0526 | | | |
| 30 | 45.6062 | 7.0002 | 1.85026 | 32.27 | 0.59299 |
| 31 | −47.2286 | 0.3000 | | | |

TABLE 7-continued

Example 3 • Lens Data (n and ν are based on d line)

| Surface Number | Radius of Curvature | Surface Distance | n | ν | θgf |
|---|---|---|---|---|---|
| 32 | −53.8124 | 6.6472 | 1.51742 | 52.43 | 0.55649 |
| 33 | −27.5720 | 1.9002 | 1.75520 | 27.51 | 0.61033 |
| 34 | −541.8644 | 28.4187 | | | |
| 35 | ∞ | 2.8500 | 1.51680 | 64.20 | 0.53430 |
| 36 | ∞ | 1.1000 | | | |

TABLE 8

Example 3 • Specification (d Line)

|  | Infinity | Close Range (1.57 m) |
|---|---|---|
| f | 193.99 | 179.01 |
| FNo. | 2.06 | 2.38 |
| 2ω [°] | 9.0 | 8.2 |

TABLE 9

Example 3 • Variable Surface Distance

|  | Infinity | Close Range (1.57 m) |
|---|---|---|
| DD[15] | 20.36 | 7.03 |
| DD[18] | 4.90 | 18.22 |

Figure 4:
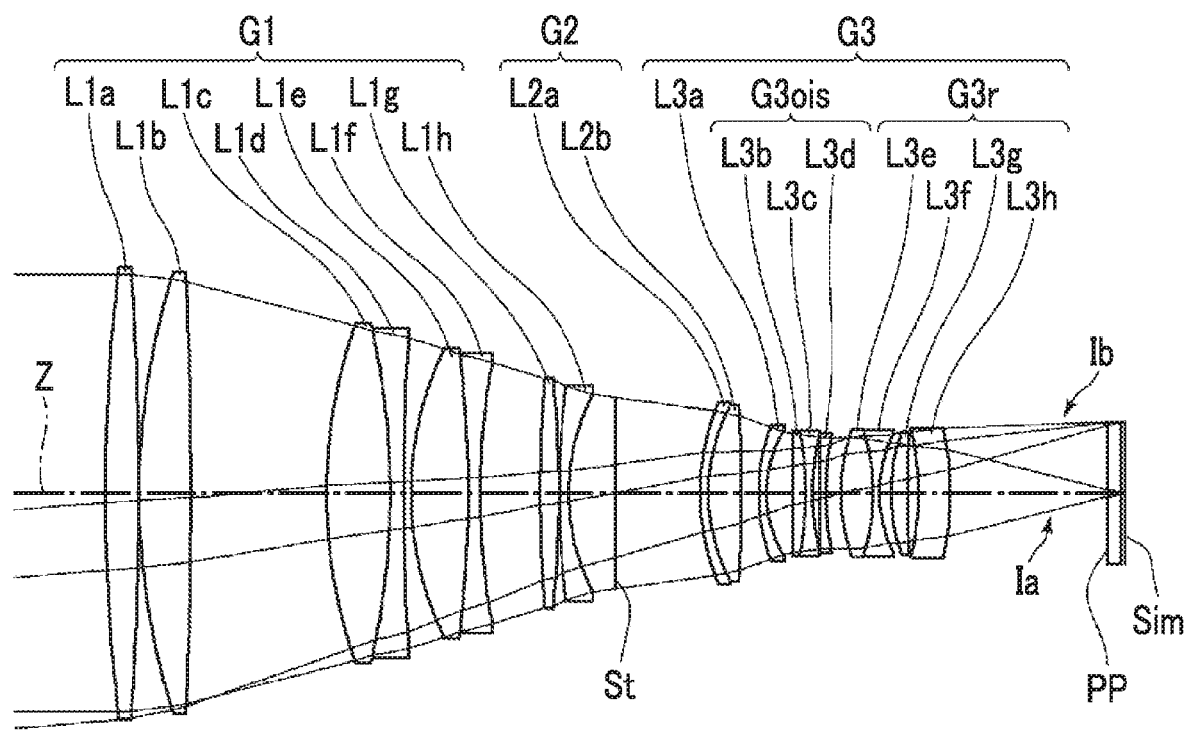
FIG. 4 is a cross-sectional view illustrating a lens configuration of an imaging lens of Example 4 of the present invention.
Figure 4:
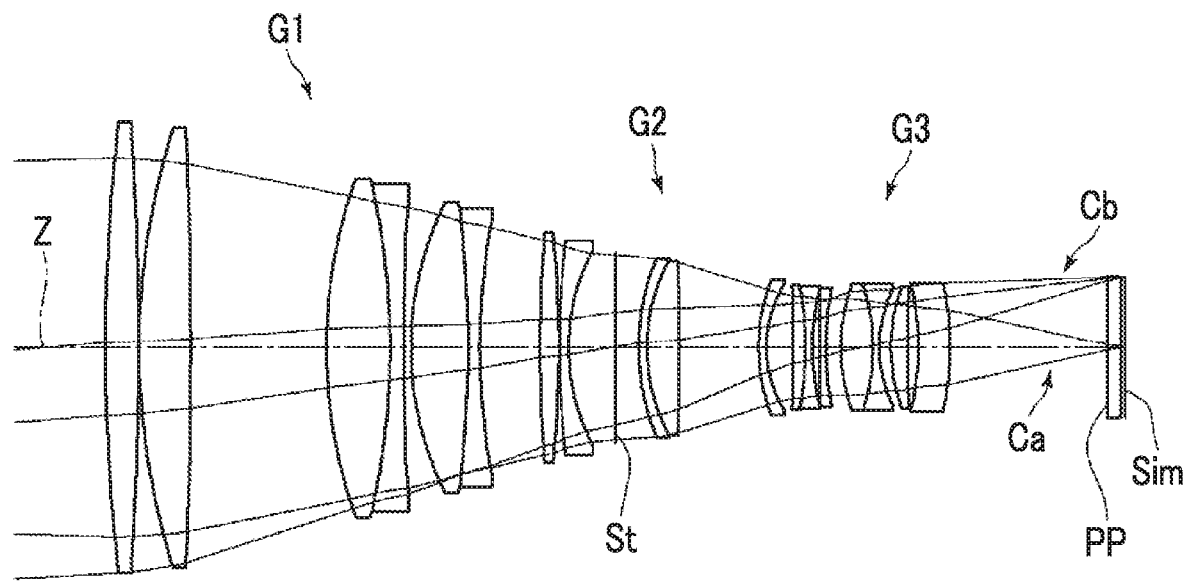
Figure 8:
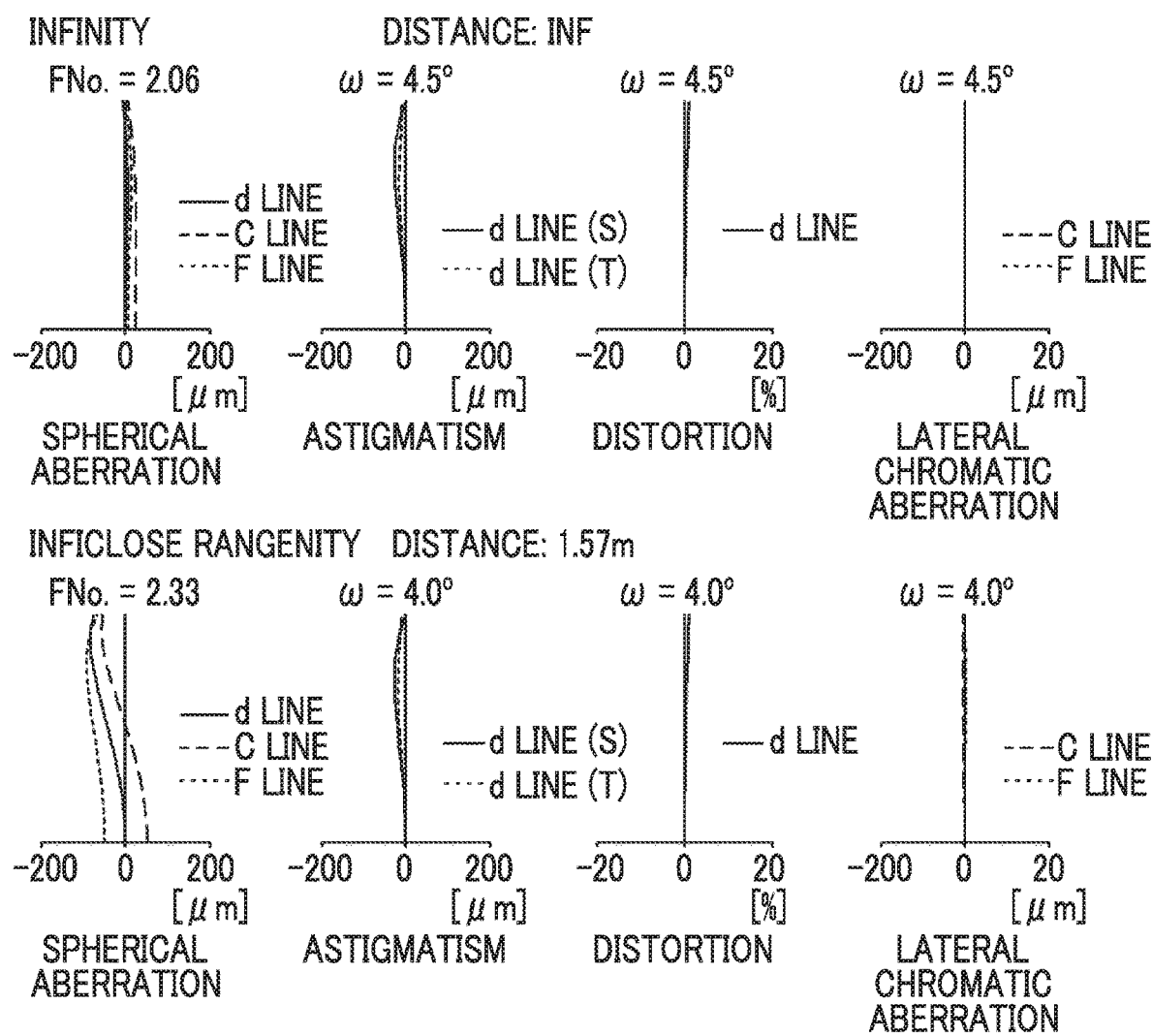
FIG. 8 is a diagram of aberrations of the imaging lens of Example 4 of the present invention.

Next, an imaging lens of Example 4 will be described. FIG. 4 is a cross-sectional view illustrating a lens configuration of the imaging lens of Example 4. The group configuration of the imaging lens of Example 4 is the same as the imaging lens of Example 1 except that the third lens group G3 is composed of eight lenses L3a to L3h. In the third lens group G3, the vibration reduction lens group G3ois is composed of three lenses L3b to L3d, and the rear lens group G3r is composed of four lenses L3e to L3h. Further, Table 10 shows basic lens data of the imaging lens of Example 4, Table 11 shows data about specification, and Table 12 shows data about variable surface distances. FIG. 8 shows aberration diagrams thereof during focusing on the object at infinity and aberration diagrams thereof during focusing on the close-range (1.57 m (meters)) object.

TABLE 10

Example 4 • Lens Data (n and ν are based on d line)

| Surface Number | Radius of Curvature | Surface Distance | n | ν | θgf |
|---|---|---|---|---|---|
| 1 | 411.1910 | 7.0788 | 1.59270 | 35.31 | 0.59336 |
| 2 | −783.9622 | 0.1998 | | | |
| 3 | 157.9844 | 11.3824 | 1.43387 | 95.18 | 0.53733 |
| 4 | −979.8539 | 29.1491 | | | |
| 5 | 109.1871 | 13.7051 | 1.49700 | 81.54 | 0.53748 |
| 6 | −162.8971 | 2.9998 | 1.81600 | 46.62 | 0.55682 |
| 7 | 561.4165 | 1.4998 | | | |
| 8 | 71.1159 | 12.2734 | 1.49700 | 81.54 | 0.53748 |
| 9 | −252.4552 | 2.6000 | 1.90366 | 31.31 | 0.59481 |
| 10 | 152.4778 | 12.9485 | | | |
| 11 | 329.2005 | 3.9241 | 1.85896 | 22.73 | 0.62844 |
| 12 | −281.5785 | 0.3001 | | | |
| 13 | 201.5251 | 1.9998 | 1.83481 | 42.74 | 0.56490 |
| 14 | 45.6609 | 9.8306 | | | |
| 15 (Stop) | ∞ | DD[15] | | | |

TABLE 10-continued

Example 4 • Lens Data (n and ν are based on d line)

| Surface Number | Radius of Curvature | Surface Distance | n | ν | θgf |
|---|---|---|---|---|---|
| 16 | 50.4067 | 1.8100 | 1.51742 | 52.43 | 0.55649 |
| 17 | 40.5884 | 7.0158 | 1.51633 | 64.14 | 0.53531 |
| 18 | −527.3168 | DD[18] | | | |
| 19 | 40.0225 | 1.6998 | 1.80809 | 22.76 | 0.63073 |
| 20 | 26.1519 | 5.6749 | | | |
| 21 | −2449.0499 | 2.7887 | 2.00272 | 19.32 | 0.64514 |
| 22 | −67.3353 | 1.5098 | 1.73400 | 51.47 | 0.54874 |
| 23 | 55.2906 | 1.4783 | | | |
| 24 | 496.4175 | 1.4001 | 1.85896 | 22.73 | 0.62844 |
| 25 | 68.8324 | 3.2000 | | | |
| 26 | 40.8755 | 6.9154 | 1.73400 | 51.47 | 0.54874 |
| 27 | −43.8133 | 1.4098 | 1.51742 | 52.43 | 0.55649 |
| 28 | 29.5881 | 2.4117 | | | |
| 29 | 37.4505 | 3.7408 | 1.85150 | 40.78 | 0.56958 |
| 30 | 3119.6621 | 2.2407 | | | |
| 31 | −55.8576 | 7.0002 | 1.62588 | 35.70 | 0.58935 |
| 32 | −65.7215 | 33.8550 | | | |
| 33 | ∞ | 2.8500 | 1.51680 | 64.20 | 0.53430 |
| 34 | ∞ | 1.1000 | | | |

TABLE 11

Example 4 • Specification (d Line)

| | Infinity | Close Range (1.57 m) |
|---|---|---|
| f | 193.99 | 178.01 |
| RNo. | 2.06 | 2.33 |
| 2ω [°] | 9.0 | 8.0 |

TABLE 12

Example 4 • Variable Surface Distance

| | Infinity | Close Range (1.57 m) |
|---|---|---|
| DD[15] | 18.28 | 5.03 |
| DD[18] | 3.75 | 17.00 |

Table 13 shows values corresponding to Conditional Expressions (1) to (5) of the imaging lenses of Examples 1 to 4. It should be noted that, in the above-mentioned examples, the d line is set as the reference wavelength, and the values shown in Table 13 are values at the reference wavelength.

TABLE 13

| Expression Number | Conditional Expression | Example 1 | Example 2 | Example 3 | Example 4 |
|---|---|---|---|---|---|
| (1) | f3ois/f3r | −0.904 | −1.012 | −1.126 | −1.104 |
| (2) | f/f3 | −0.149 | 0.025 | −0.262 | −0.294 |
| (3) | D2o/L | 0.069 | 0.072 | 0.069 | 0.051 |
| (4) | νdop | 17.47 | 17.47 | 17.47 | 19.32 |
| (5) | νd1 | 32.10 | 27.51 | 35.70 | 35.31 |

As can be seen from the above-mentioned data, all the imaging lenses of Examples 1 to 4 satisfy the conditional expressions (1) to (5), and are imaging lenses each of which has a small F number of about 2 and in which weights of both the focus lens group and the vibration reduction lens group are reduced.

Figure 9:
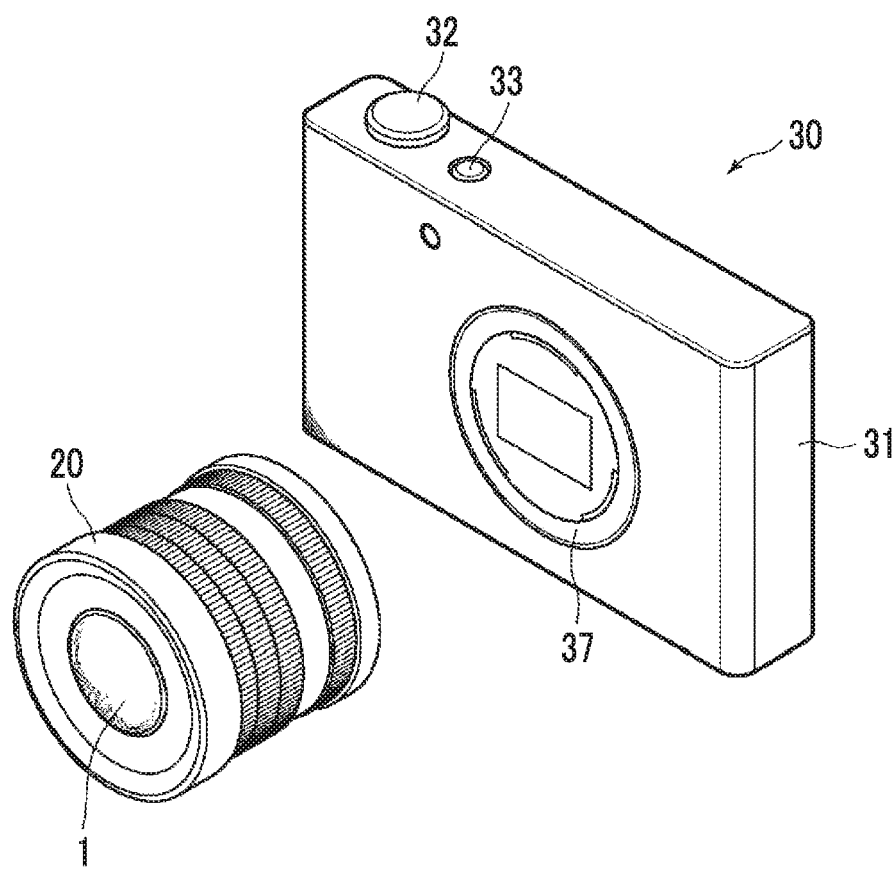
FIG. 9 is a perspective view illustrating the front side of an imaging apparatus according to an embodiment of the present invention.
Figure 10:
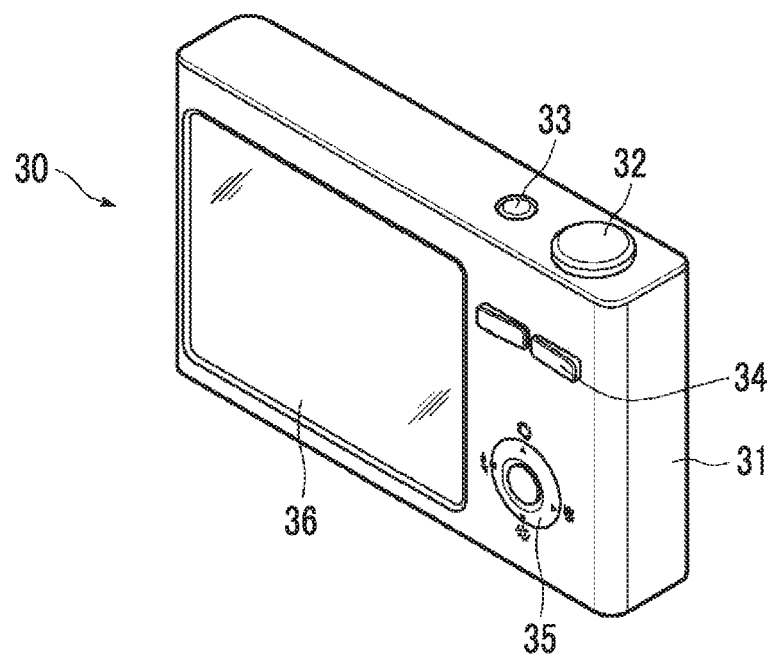
FIG. 10 is a perspective view illustrating the rear side of the imaging apparatus of FIG. 9.

Next, an embodiment of the imaging apparatus according to the embodiment of the present invention will be described with reference to FIGS. 9 and 10. In FIGS. 9 and 10, a camera 30, which is obliquely viewed respectively on the front side and the rear side, is a non-reflex (so-called mirrorless) type digital camera on which an interchangeable lens 20 housing the imaging lens 1 according to the above-mentioned embodiment of the present invention in a lens barrel is detachably mounted.

The camera 30 comprises a camera body 31, and a shutter button 32 and a power button 33 are provided on an upper surface thereof. Further, operation sections 34 and 35 and a display section 36 are provided on a rear surface of the camera body 31. The display section 36 is for displaying a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element (not shown in the drawing), a signal processing circuit, a recording medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The recording medium records the generated image. The camera 30 is able to capture a still image or a moving image by pressing the shutter button 32, and is able to store image data, which is obtained through imaging, in the storage medium.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens component are not limited to the values shown in the examples, and different values may be used therefor.

In the above-mentioned embodiment of the imaging apparatus, the non-reflex type digital camera is taken as an example and described with the drawings. However, the imaging apparatus of the embodiment of the present invention is not limited to this. For example, the present invention may be applied to imaging apparatuses such as video cameras, digital cameras which are not the non-reflex type, movie imaging cameras, broadcast cameras.

EXPLANATION OF REFERENCES

1: imaging lens
20: interchangeable lens
30: camera
31: camera body
32: shutter button
33: power button
34, 35: operation section
36: display section
37: mount
Ca: on-axis rays during focusing on close-range object
Cb: rays with maximum angle of view during focusing on close-range object
G1: first lens group
G2: second lens group (focus lens group)

G3: third lens group
G3ois: vibration reduction lens group
G3r: rear lens group
Ia: on-axis rays during focusing on object at infinity
Ib: rays with maximum angle of view during focusing on object at infinity
L1a to L3i: lens
PP: optical member
Sim: image plane
St: aperture stop
Z: optical axis

What is claimed is:

1. An imaging lens comprising, in order from an object side:
a first lens group that has a positive refractive power;
an aperture stop;
a second lens group that has a positive refractive power; and
a third lens group that has a refractive power,
wherein the second lens group consists of two or less lenses, and moves to the object side during focusing from an object at infinity to an object at a closest distance,
wherein the third lens group includes, successively in order from at a position closest to an image side, a rear lens group that has a positive refractive power and a vibration reduction lens group that has a negative refractive power and moves in a direction intersecting with an optical axis during image blur correction, and
wherein
a focal length of the vibration reduction lens group is f3ois, and
a focal length of the rear lens group is f3r,
Conditional Expression (1) is satisfied $$-1.5 < f3ois/f3r < -0.85 \qquad (1).$$

2. The imaging lens according to claim 1, wherein
a focal length of a whole system is f, and
a focal length of the third lens group is f3,
Conditional Expression (2) is satisfied $$-0.32 < f/f3 < 0.3 \qquad (2).$$

3. The imaging lens according to claim 1, wherein
a distance on the optical axis from a surface closest to the image side in the second lens group to a surface closest to the object side in the vibration reduction lens group during focusing on the object at infinity is D2o, and
a distance on the optical axis from a surface closest to the object side in the first lens group to an image plane is L,
Conditional Expression (3) is satisfied $$0.04 < D2o/L < 0.1 \qquad (3).$$

4. The imaging lens according to claim 1, wherein the vibration reduction lens group includes a positive lens and a negative lens, and wherein
an Abbe number of the positive lens included in the vibration reduction lens group at a d line is vdop,
one positive lens included in the vibration reduction lens group satisfies Conditional Expression (4)

$$vdop < 20 \qquad (4).$$

5. The imaging lens according to claim 1, further comprising at least one negative lens between the second lens group and the vibration reduction lens group.

6. The imaging lens according to claim 1, wherein the rear lens group includes at least four lenses.

7. The imaging lens according to claim 1, wherein the rear lens group includes, successively in order from at a position closest to the object side, a positive lens and a negative lens.

8. The imaging lens according to claim 1, wherein the first lens group includes, successively in order from at the position closest to the image side, a negative lens and a positive lens with an air gap interposed therebetween.

9. The imaging lens according to claim 1, wherein the first lens group includes, successively in order from at a position closest to the object side, a positive lens, a positive lens, and a cemented lens in which a positive lens and a negative lens are cemented in order from the object side.

10. The imaging lens according to claim 1, wherein
an Abbe number of the lens closest to the object side in the first lens group at a d line is vd1,
Conditional Expression (5) is satisfied $$10 < vd1 < 43 \qquad (5).$$

11. The imaging lens according to claim 1, wherein Conditional Expression (1-1) is satisfied $$-1.2 < f3ois/f3r < -0.88 \qquad (1\text{-}1).$$

12. The imaging lens according to claim 2, wherein Conditional Expression (2-1) is satisfied $$-0.3 < f/f3 < 0.1 \qquad (2\text{-}1).$$

13. The imaging lens according to claim 3, wherein Conditional Expression (3-1) is satisfied $$0.05 < D2o/L < 0.08 \qquad (3\text{-}1).$$

14. The imaging lens according to claim 4, wherein Conditional Expression (4-1) is satisfied $$10 < vdop < 20 \qquad (4\text{-}1).$$

15. The imaging lens according to claim 10, wherein Conditional Expression (5-1) is satisfied $$15 < vd1 < 38 \qquad (5\text{-}1).$$

16. An imaging apparatus comprising the imaging lens according to claim 1.

* * * * *